(12) United States Patent
Matsumori et al.

(10) Patent No.: US 8,013,953 B2
(45) Date of Patent: Sep. 6, 2011

(54) POLARIZER AND LIQUID CRYSTAL DISPLAY DEVICE USING SAME

(75) Inventors: Masaki Matsumori, Tokai (JP); Yasushi Tomioka, Hitachinaka (JP); Katsuyuki Funahata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 892 days.

(21) Appl. No.: 12/015,616

(22) Filed: Jan. 17, 2008

(65) Prior Publication Data

US 2008/0284949 A1 Nov. 20, 2008

(30) Foreign Application Priority Data

Jan. 24, 2007 (JP) ................................ 2007-013777

(51) Int. Cl.
*G02F 1/1335* (2006.01)
*G02B 5/30* (2006.01)

(52) U.S. Cl. ..... 349/96; 349/117; 349/194; 359/486.01; 359/487.03

(58) Field of Classification Search .................... 349/96, 349/87, 97, 98, 91, 117, 122, 123, 138, 194; 359/486, 486.01, 487.03
See application file for complete search history.

(56) References Cited

U.S. PATENT DOCUMENTS

| 7,518,662 | B2 * | 4/2009 | Chen et al. .................... 349/5 |
| 2005/0271833 | A1 | 12/2005 | Matsumori et al. |
| 2006/0274272 | A1 | 12/2006 | Yoshide et al. |
| 2006/0285042 | A1 * | 12/2006 | Chen et al. ................. 349/117 |
| 2007/0139771 | A1 * | 6/2007 | Wang et al. ................. 359/494 |
| 2007/0165308 | A1 * | 7/2007 | Wang et al. ................. 359/494 |
| 2008/0055521 | A1 * | 3/2008 | Mizutani et al. ............. 349/96 |
| 2008/0284949 | A1 * | 11/2008 | Matsumori et al. ........... 349/96 |
| 2009/0009865 | A1 * | 1/2009 | Nishida et al. .............. 359/486 |

FOREIGN PATENT DOCUMENTS

| CN | 1428628 | 7/2003 |
| CN | 1866106 | 11/2006 |
| JP | 2001-074935 | 3/2001 |
| JP | 2004-349061 | 12/2004 |
| JP | 2005-195824 | 7/2005 |

* cited by examiner

*Primary Examiner* — Brian M Healy
(74) *Attorney, Agent, or Firm* — Antonelli, Terry, Stout & Kraus, LLP.

(57) ABSTRACT

An object of the present invention is to provide a liquid crystal display device having a wide view angle, reduced power consumption and high quality with an absorption axis of a polarizing plate and an optical axis of a retardation plate made to coincide with high accuracy without using expensive equipment and complicated steps. On a transparent substrate 11 is formed a retardation film 21 that is self-organized due to irregularities on a surface of a metal wire 12 formed on a wire grid polarizer to thereby generate a retardation.

14 Claims, 8 Drawing Sheets

POLARIZER AND LIQUID CRYSTAL DISPLAY DEVICE USING SAME

BACKGROUND OF THE INVENTION

The present invention relates to a polarizer and a retardation plate for use in a liquid crystal display device.

Liquid crystal displays have found an expanding range of applications because of high display quality and reduced thickness and power consumption, and they are applied to a variety of products ranging from portable monitors such as displays for mobile phones and displays for digital still cameras to monitors for desktop personal computers, monitors for printing and design, monitors for medical use, and further, liquid crystal televisions.

As the range of applications of liquid crystal displays has been expanded in recent years, still further improvement of quality of the liquid crystal display has been desired, and above all, the needs for a wider view angle, a higher contrast ratio and reduced power consumption have intensified.

The display principle of the liquid crystal display is to display variations of light and shade using the refractive index anisotropy of liquid crystal molecules and the polarization and transmission characteristic of a polarizing plate. However, the refractive index of liquid crystal molecules varies depending on the direction, and accordingly, the refractive index of a liquid crystal layer varies depending on whether the liquid crystal display is viewed from the front or aslant. This is a main factor of causing a change in the color tone and a change in the contrast ratio with the view angle of the liquid crystal display. The black of the liquid crystal display is displayed by crossed nicols of the polarizing plate, but when viewed aslant, an absorption axis of the polarizing plate shifts from orthogonality, resulting in light leakage. Thus, the contrast ratio decreases when viewed aslant. For correction of the problem of the view angle characteristic of the liquid crystal display, a retardation plate capable of optical compensation is used in the liquid crystal display.

General retardation plates include those made by stretching a polymer film and those using a liquid crystal. In the case of a stretched polymer film, an optical axis extends in parallel or perpendicularly to the stretching direction, and therefore when a retardation film is prepared, the optical axis of the retardation film is parallel or perpendicular to the longer direction of the film. The film is cut in accordance with the size of a liquid crystal display element and laminated to the polarizing plate and the liquid crystal display, but a shift of the optical axis occurs at the time of cutting or laminating the film. Furthermore, in the case where the film is cut at a certain angle with respect to the longer direction of the film, or the like, it is difficult to cut the film with high axis accuracy and usage efficiency is poor.

Next, the retardation plate using a liquid crystal requires an alignment film and an alignment treatment thereof. The alignment treatments include a rubbing alignment treatment and an optical alignment treatment. The rubbing alignment treatment has the problem of generation of static electricity and dusts at the time of rubbing and occurrence of unevenness and the like at during a large screen treatment. The optical alignment treatment is useful without generating static electricity or dusts, but has the problem of polarization axis accuracy of irradiated light. In addition, there is the problem of axis accuracy at the time of cutting or lamination to the polarizing plate as in the case of the stretched film type.

The retardation plate is arranged such that the refractive index anisotropy axis of the retardation plate forms a certain angle with the absorption axis of the polarizing plate and the refractive index anisotropy axis of the liquid crystal, and generally, the retardation plate is laminated to the polarizing plate and the liquid crystal panel using an adhesive. At this time, if the optical axis of the retardation plate shifts even slightly, desired optical properties cannot be obtained, and there arises the problem of a change in the color tone and a decrease in the contrast ratio in the liquid crystal display.

As the polarizing plate used in the liquid crystal display device, iodine-based polarizing plates made by impregnating a polyvinyl alcohol with iodine and stretching the resulting material are currently widely used. The iodine-based polarizing plate absorbs one of polarizing components of light and transmits the polarizing component in the orthogonal direction. Such an absorption polarizing plate has the problem of poor light usage efficiency, since it can use at most 50% of the amount of light from a light source of the liquid crystal display device. Patent Document 1 shown below discloses a wire grid polarizing optical element intended for improvement of usage efficiency of light.

Patent Document 1: JP-A-2001-74935

When an absorption polarizing plate such as an iodine-based polarizing plate is used in the liquid crystal display device, usage efficiency of light is 50% or less in principle. On the other hand, a wire grid polarizer is a reflection polarizer reflecting light having an electric vector parallel to the longer direction of a wire (metal wire) and transmitting light having an electric vector in the vertical direction. By reusing light of the reflected component, usage efficiency of light can be improved.

However, the wire grid polarizer has the following three problems. First, the surface of the metal wire of the wire grid polarizer having a metal wire formed on a transparent substrate has low contact resistance, and the metal wire is thus fragile. This raises a problem in handling during manufacture and reliability of the product. Second, when the retardation plate and the polarizing plate are laminated together, an adhesive is required, but the adhesive layer reduces the degree of polarization of straight polarized light which has passed through the polarizing plate, and the contrast ratio of the liquid crystal display device thus decreases. This is ascribable to light scattering caused by the adhesive layer. Third, when the wire grid polarizer is used in the liquid crystal display device, the polarizer is warped by heat of the light source.

SUMMARY OF THE INVENTION

Thus, it is an object of the present invention to provide a wire grid polarizer with a retardation function and a wire grid polarizer with a polarizing film in which the optical axes of a retardation plate and a polarizing plate coincide with high accuracy, and a liquid crystal display device using the same.

Namely, the present invention provides the following polarizer and liquid crystal display device.

A polarizer comprising a transparent substrate and a plurality of metal wires formed mutually in parallel on one surface of the transparent substrate, wherein a resin film having birefringence is formed on a surface of the metal wire.

A polarizer comprising a transparent substrate and a plurality of metal wires formed mutually in parallel on one surface of the transparent substrate, wherein an alignment film is formed on a surface of the metal wire, and a resin film having birefringence is formed on a surface of the alignment film.

A polarizer comprising a transparent substrate and a plurality of metal wires formed mutually in parallel on one surface of the transparent substrate, wherein a resin film containing a photoisomerized compound is formed on a surface of the metal wire, and the resin film has an absorption axis in a direction parallel to the metal wire.

A liquid crystal display apparatus comprising:
a pair of substrates;
a polarizing plate placed on the pair of substrates;
a liquid crystal layer placed between the pair of substrates;
a group of electrodes formed on at least any one of the pair of substrates to apply an electric field to the liquid crystal layer; and
a pair of alignment films formed on the pair of substrates, respectively, and a light source placed outside the pair of substrates,
wherein the polarizing plate on the light source side is the polarizer set forth in any of claims 1 to 12.

As described above, according to the present invention, there can be provided a wire grid polarizer with a retardation function and a wire grid polarizer with a polarizing film in which the optical axes of a retardation plate and a polarizing plate coincide with high accuracy, and a liquid crystal display device using the same without using expensive materials and complicated production processes.

Other object, features and advantages of the invention will become apparent from the following description of the embodiments of the invention taken in conjunction with the accompanying drawings.

DESCRIPTION OF SYMBOLS

11 transparent substrate
12 metal wire
13 wire grid polarizer
14 polarizer
21 retardation film
22 alignment film
23 polarizing film
31 rod-like liquid crystal molecule
32 disk-like liquid crystal molecule
41 light
51 liquid crystal panel
52 backlight light source unit
53 ¼ wave plate
54 reflecting plate
101, 102 glass plate
103 common electrode
104 scan electrode (gate electrode)
105 pixel electrode (source electrode)
106 signal electrode (drain electrode)
107 insulating film
108 protective insulating film
110 liquid crystal molecule
110' liquid crystal layer (liquid crystal composition layer)
111 color filter
113 light blocking film (black matrix)
116 semiconductor film
117 electric field direction
120 common electrode wiring
131 alignment film
133, 134 organic insulating film

DETAILED DESCRIPTION OF THE INVENTION

A wire grid polarizer with a retardation film according to the present invention will be described below using FIGS. 1 to 9.

Figure 1:
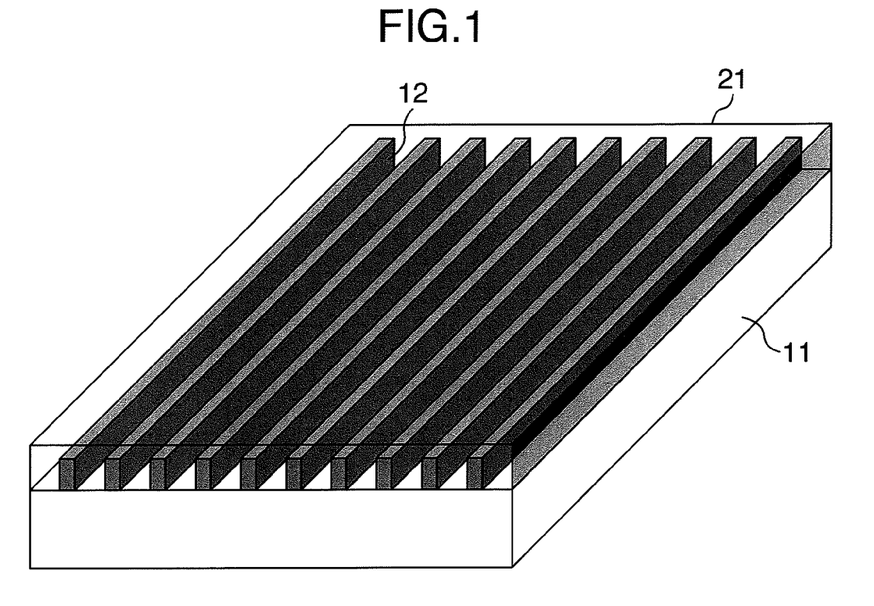
FIG. 1 is a structural diagram of a wire grid polarizer with a retardation film.
Figure 2:
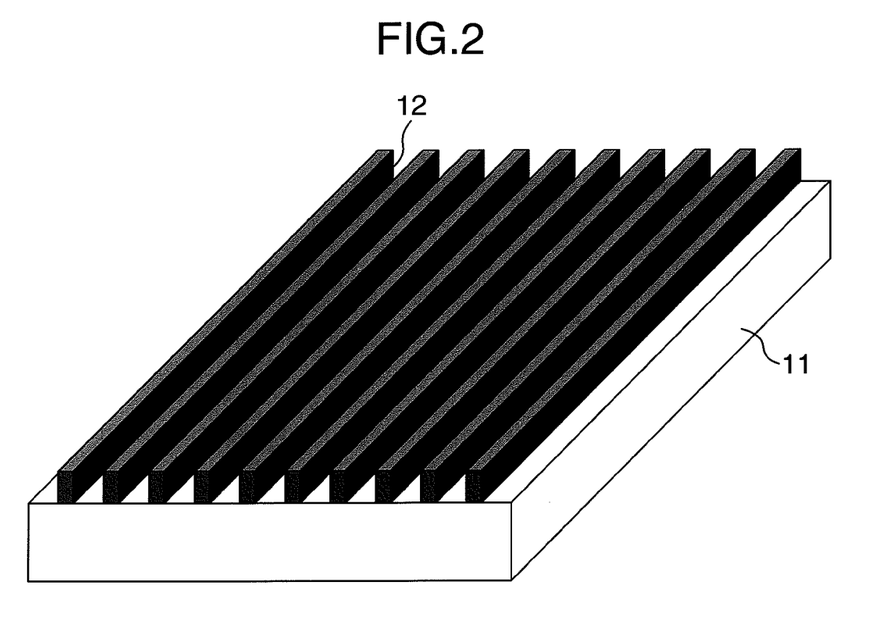
FIG. 2 is a structural diagram of a conventional wire grid polarizer.

As shown in FIG. 1, the wire grid polarizer with a retardation film is constituted such that a linear metal wire 12 is formed on a transparent substrate 11, and a retardation film 21 as a resin layer having a retardation is formed on the transparent substrate 11 and the metal wire 12. The retardation film 21 also acts as a protective film protecting the metal wire 12 from contact or the like. In addition, since it is not required to provide an adhesive layer between the polarizer and the retardation film, a reduction in extinction ratio can be avoided, thus being effective for increasing a contrast ratio in a liquid crystal display device.

The retardation film 21 is composed of liquid crystal molecules, disk-like molecules, a liquid crystal polymer, or a mixture thereof. The polarizer is characterized in that the retardation of the retardation film 21 is generated by self organization due to an irregular structure of the metal wire 12. A polarization and transmission axis and an optical axis of the retardation film is determined by the irregular structure of the metal wire 12, and therefore the polarization axis and the optical axis of the retardation layer can be made to coincide with high accuracy using a conventional wire grid polarizer shown in FIG. 2.

Figure 3:
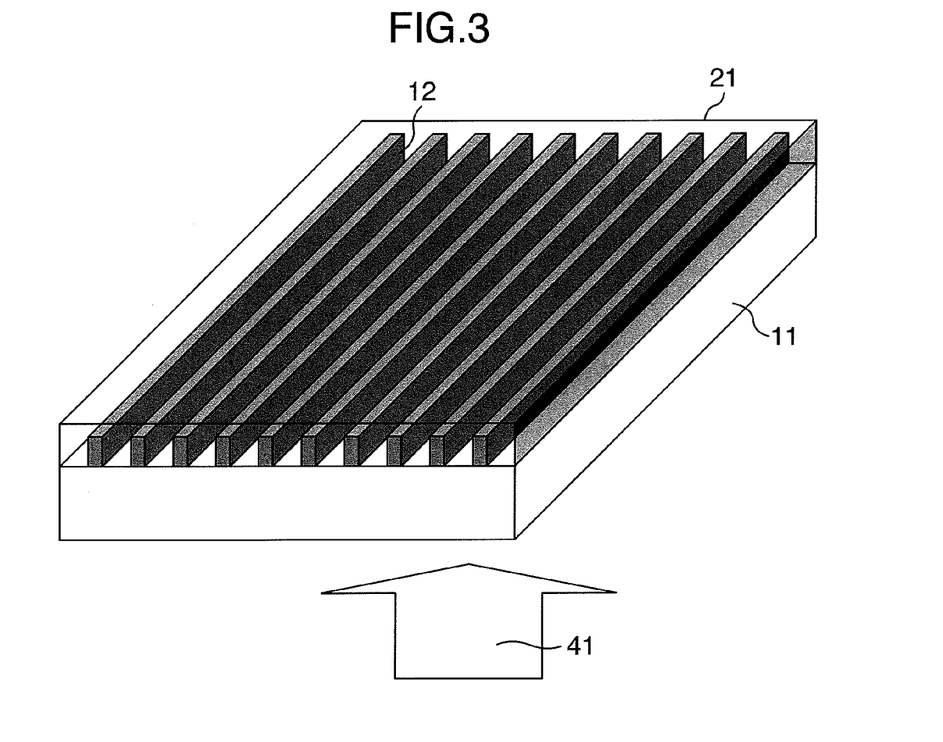
FIG. 3 is a view showing a direction which an ultraviolet ray is applied.
Figure 4:
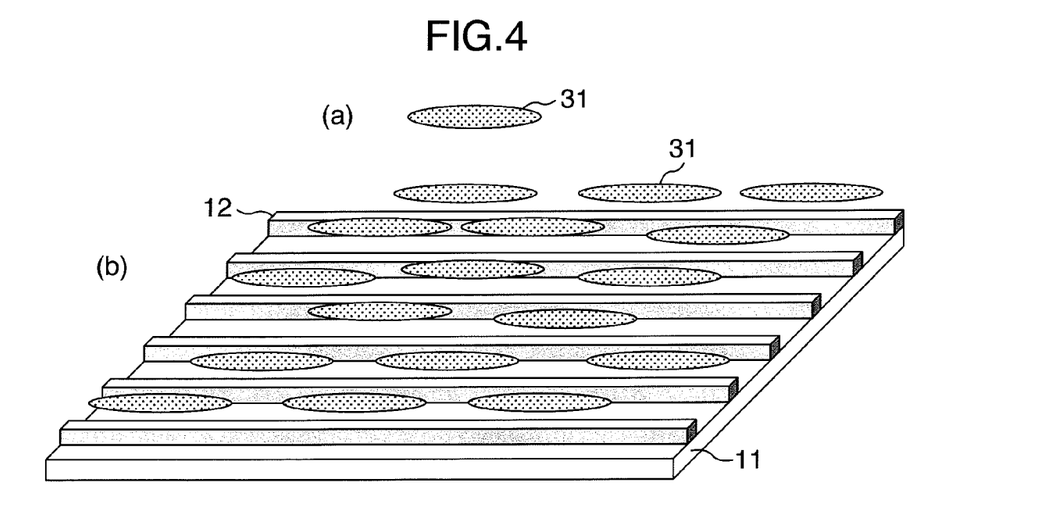
FIG. 4(A) is a schematic diagram of a rod-like liquid crystal molecule.
FIG. 4(B) is a schematic diagram of a situation in which rod-like liquid crystal molecules arranged on the surface of a metal wire of the wire grid polarizer with a retardation film.
Figure 5:
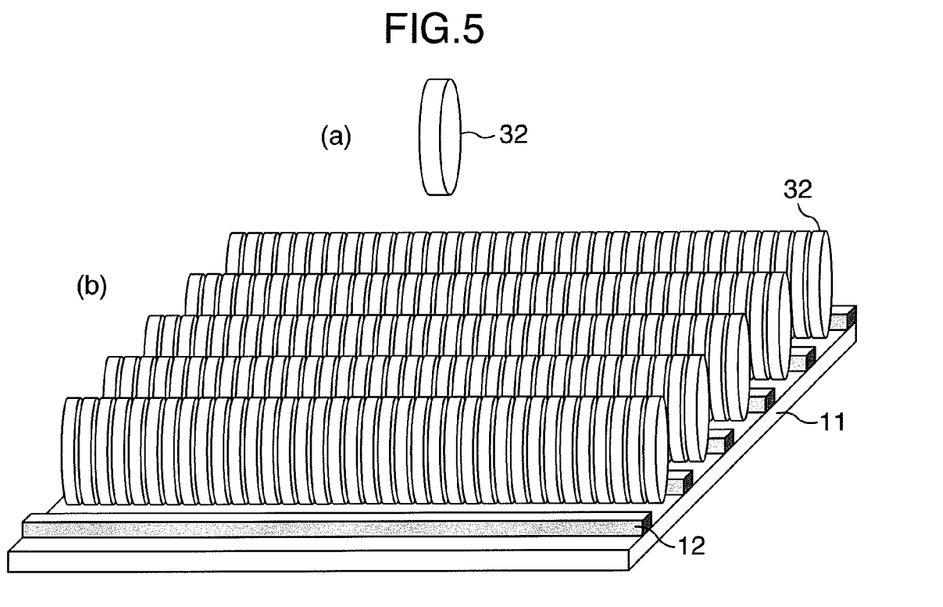
FIG. 5(A) is a schematic diagram of a disk-like liquid crystal molecule.
FIG. 5(B) is a schematic diagram of a situation in which disk-like liquid crystal molecules are arranged on the surface of the metal wire of the wire grid polarizer with a retardation film.

Furthermore, the polarizer is characterized in that the retardation of the retardation film 21 is generated by applying light 41, especially an ultraviolet ray by a method shown in FIG. 3. Light 42 applied is polarized by the wire grid polarizer and the retardation is generated by the polarization, and therefore the polarization axis of the wire grid polarizer and the optical axis of the retardation layer can be made to coincide exactly.

The polarizer is characterized in that the liquid crystal molecules and disk-like molecules forming the retardation film 21 have a photopolymerizable part or a thermally polymerizable part. By having the polymerizable part, the align- ment of liquid crystal molecules can be fixed, thus being effective for ensuring long-term reliability.

In the wire grid polarizer with a retardation film shown in FIG. 1, the narrower the pitch of the metal wire 12 and the higher the aspect ratio, the higher extinction ratio can be obtained over a wide wave range, especially a short wave range. In the liquid crystal display device, it is required to obtain a good extinction ratio in the visible range of wavelengths of 380 to 800 nm, and it is therefore preferable that the pitch of the metal wire is 50 nm to 300 nm, the width of the metal wire is 25 nm to 200 nm, and the aspect ratio of the metal wire is 1 or greater. This condition is effective, since the retardation film 21 formed on the surface of the metal wire is easily self-organized. Thus, the condition that the pitch of the metal wire 12 is 50 nm to 300 nm, the width of the metal wire is 25 nm to 200 nm, and the aspect ratio of the metal wire is 1 or greater effectively functions in self organization of the retardation film 21.

The transparent substrate 11 preferably has high transparency to a visible range and have excellent heat resistance and impact resistance. Specific examples include inorganic material substrates of glass, quarts and the like, and polymer resin substrates of polycarbonate, polyethylene terephthalate, polyethylene naphthalate, polyacrylate, polyetherketone, polyethersulfone, polyketone, polyimide, triacetylcellulose, polyvinyl alcohol, bulky cyclic olefin resin, polyester, polysulfone, polymethylmethacrylate, polystyrene, diethylene glycol biscarbonate, styrene/acrylonitrile copolymer, styrene/methacrylic acid copolymer and the like. A material having a low thermal expansion coefficient is preferable in consideration of the problem of warpage of the transparent substrate 11 if it is used in the liquid crystal display device.

The material of the metal wire 12 preferably has a high reflectance at a wavelength used, and examples of the material include aluminum, gold, silver, copper, tungsten and lead.

As liquid crystal molecules forming the retardation film 21, molecules having a rod-like shape or disk-like shape are effective, since they are easily arranged along irregularities on the surface of the wire. Rod-like liquid crystal molecules 31, with one shown in FIG. 4(A), are arranged such that the longitudinal direction of rod-like liquid crystal molecules 31 is parallel to the longer direction of the metal wire 12 as shown in FIG. 4(B). The rod-like liquid crystal molecule is characterized by having the following structure:

wherein —X— is any of the following formulae:

For chemical structural formulae (1) to (3) and (13) to (15), at least one R may be an alkyl group or an alkoxy group such as —$(CH_2)_n CH_3$ or —$O(CH_2)_n CH_3$ (n=1 to 20), and the other R may be —H, —Cl, —CN, —$NO_2$, —$N(CH_3)_2$ or a phenyl group. A vinyl group of —CH=CH— may exist in the main chain of the alkyl group or the alkoxy group. The hydrogen atom on the aromatic ring may be replaced by a fluorine atom. The phenyl ring may be a cyclohexane ring.

It is effective for stabilization of alignment of molecules after self organization to have the following structure as R, since photopolymerization or thermal polymerization occurs:

(17)

(18)

wherein n=1 to 10.

For disk-like liquid crystal molecules as liquid crystal molecules forming the retardation film 21, disk-like liquid crystal molecules 32, with one shown in FIG. 5(A), are stacked into a columnar shape and arranged along the groove of the metal wire 12 as shown in FIG. 5(B). The disk-like liquid crystal molecule is characterized by having the following structure.

(19)

(20)

(21)

In chemical formulae (19) to (21), R' is any one of $-(CH_2)_n CH_3$, $-O(CH_2)_n CH_3$, $-OCO(CH_2)_n CH_3$, $-OCO\text{-}\Phi\text{-}(CH_2)_n CH_3$, $-OCO\text{-}\Phi\text{-}O(CH_2)_n CH_3$, $-OCOCH_2CH(CH_3)$ and $(CH_2)_n CH_3$, wherein $\Phi$ represents a phenyl group.

It is effective for stabilization of alignment of molecules after self organization to have the structural formula (16) to (18) as R', since photopolymerization or thermal polymerization occurs.

The liquid crystal polymer forming the retardation film 21 is characterized by having the following structure:

(22)

wherein n = 1 to 15;

(23)

wherein m=1 to 15, and n=1 to 15.

Figure 6:
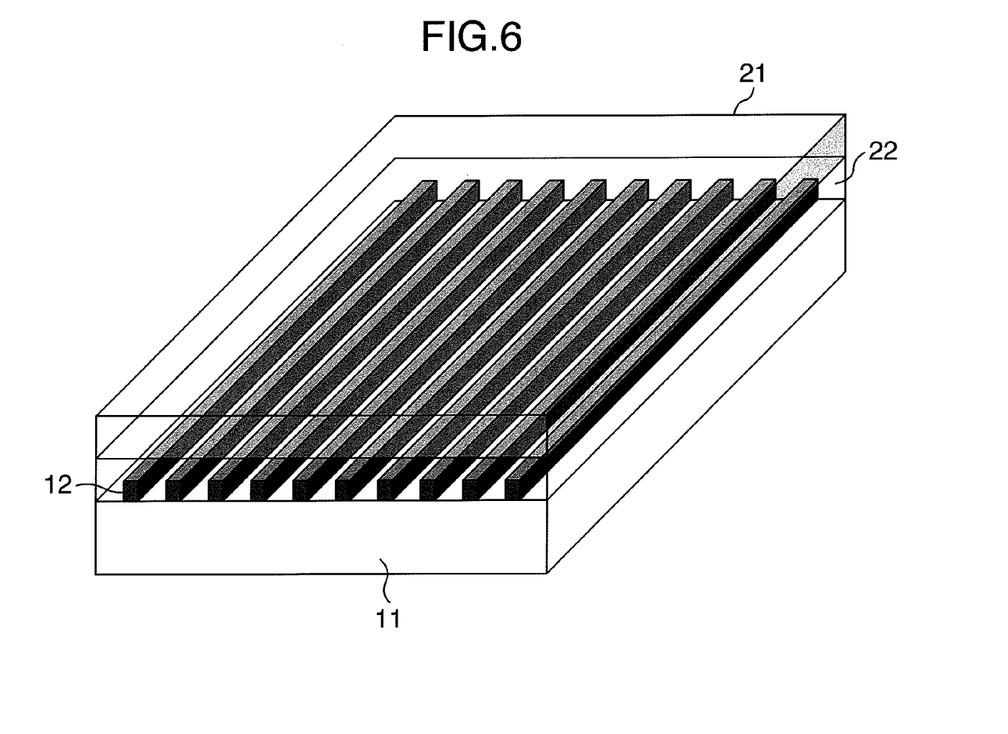
FIG. 6 is a structural diagram of the wire grid polarizer with a retardation film using an alignment film.

The wire grid polarizer with a retardation film according to the present invention is characterized in that as shown in FIG. 6, an alignment film 22 is formed on the surface of the metal wire 12 of the wire grid polarizer, and the retardation film 21 composed of liquid crystal molecules or disk-like molecules is formed on the alignment film 22. Furthermore, the polarizer is characterized in that the liquid crystal molecules or the disk-like molecules are photopolymerizable or thermally polymerizable, and form a film.

The alignment film 22 is preferably a transparent resin film, and examples thereof include polymer resins such as polycarbonate, polyethylene terephthalate, polyethylene naphthalate, polyacrylate, polyetherketone, polyethersulfone, polyketone, polyimide, triacetylcellulose, polyvinyl alcohol, a bulky cyclic olefin resin, polyester, polysulfone, polymethylmethacrylate, polystyrene, diethylene glycol biscarbonate, a styrene/acrylonitrile copolymer and a styrene/methacrylic acid copolymer.

Figure 7:
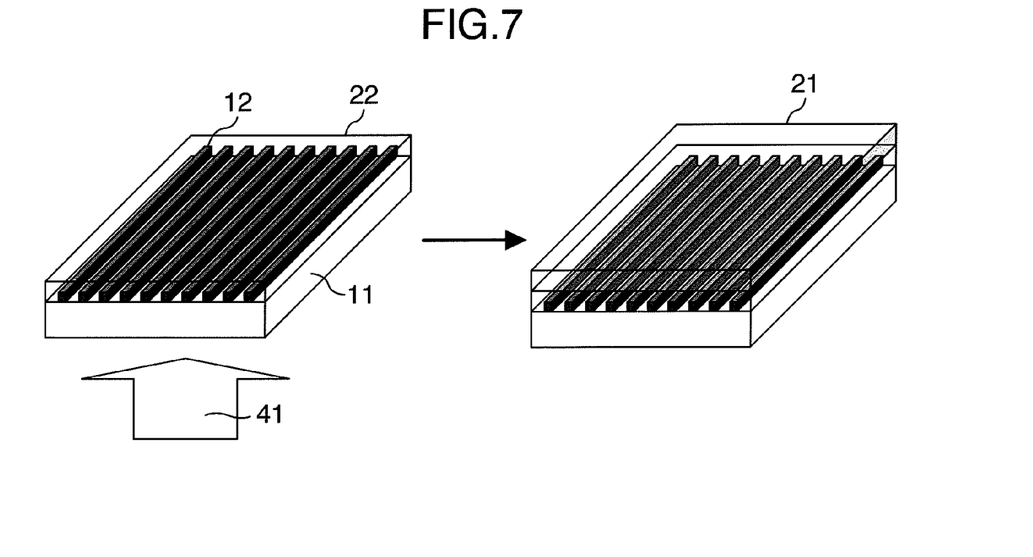
FIG. 7 shows a method for fabrication of the wire grid polarizer with a retardation film using an alignment film.

By the rubbing treatment of rubbing with a cloth or the optical alignment treatment of applying polarized light, the alignment film 22 is given an alignment capability as a function of orienting liquid crystal molecules or disk-like molecules. For giving the alignment capability, the optical alignment treatment shown in FIG. 7 is preferable. According to this method, a wire grid polarizer with a retardation film can be obtained, in which the polarization axis of the wire grid polarizer and the optical axis of the retardation film 21 coincide with high accuracy.

Figure 8:
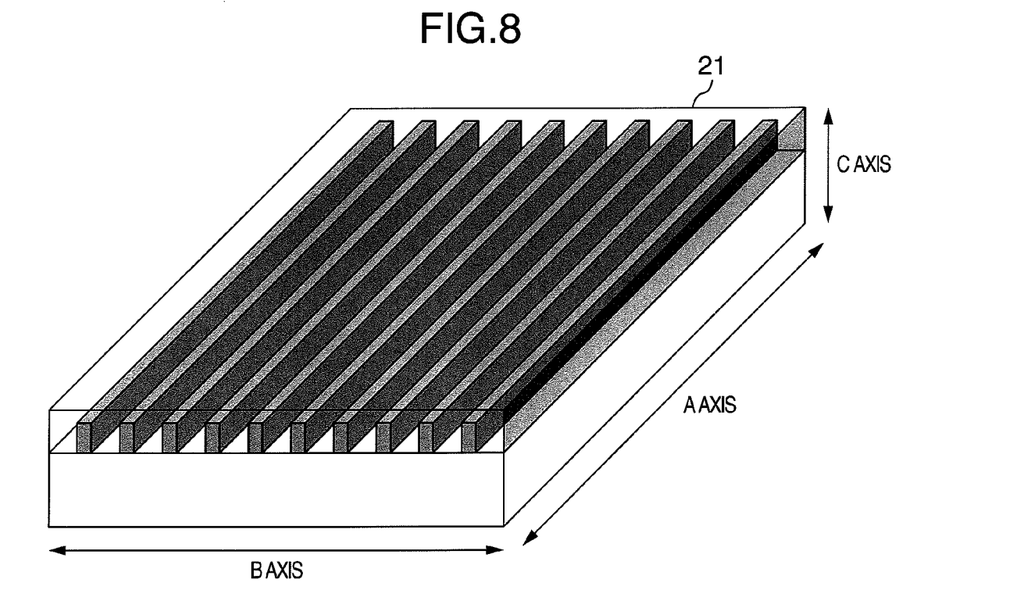
FIG. 8 is an explanatory view of an optical axis of the retardation film.

The wire grid polarizer with a retardation film according to the present invention will be described in detail below using examples. For the following description, the refractive indexes of the retardation film 21 in directions of axis A, axis B and axis C shown in FIG. 8 are defined as nA, nB and nC, respectively.

Figure 9:
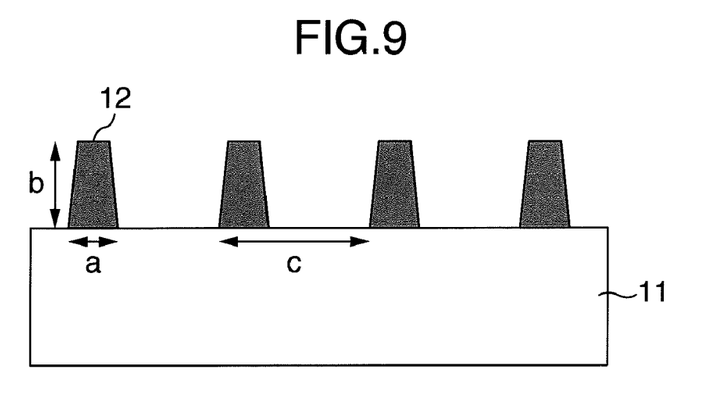
FIG. 9 is a schematic diagram of the cross-section of the metal wire of the wire grid polarizer.

The cross-section of the wire grid polarizer is schematically shown in FIG. 9. As shown in FIG. 9, the cross-section of the metal wire 12 of the wire grid polarizer is not all rectangular, but some parts are slightly tapered. If the tapered shape becomes gentle, the extinction ratio decreases, but there arises no problem from a practical standpoint. In FIG. 9, reference symbol a denotes a metal wire width, reference symbol a/b denotes an aspect ratio of the metal wire, and reference symbol c denotes a pitch of the metal wire.

EXAMPLE 1

A composition having rod-like liquid crystal molecules of the following chemical structural formulae (24) and (25) at a ratio of 4:6 was coated on a wire grid polarizer constituted such that an aluminum wire having a width of about 90 nm and an aspect ratio of about 2.5 was formed at pitches of about 180 nm on a quarts substrate having a thickness of 0.7 mm, and the coating was heated at about 110° C. for 30 minutes, and then irradiated with an ultraviolet ray having a wavelength of 365 nm at an intensity of 3 J/cm² by a 2 kW high-pressure mercury lamp to be formed into a film. The refractive indexes of the retardation film in the directions satisfied the relationship of nA>nB=nC, showing that the polarization axis of the wire grid polarizer and the optical axis of the retardation film coincided.

(24)

(25)

EXAMPLE 2

Disk-like liquid crystal molecules of the following chemical structural formula (26) were coated on a wire grid polarizer constituted such that an aluminum wire having a width of about 90 nm and an aspect ratio of about 2.5 was formed at pitches of about 180 nm on a glass substrate having a thickness of 1.1 mm, and the coating was heated at about 50° C. for 20 minutes, and then heated at about 120° C. for 30 minutes to be formed into a film. The refractive indexes of the retardation film in the directions satisfied the relationship of nB=nC>nA, showing that the polarization axis of the wire grid polarizer and the optical axis of the retardation film coincided.

(26)

EXAMPLE 3

A polymer of the following chemical formula (27) was spin-coated on a wire grid polarizer constituted such that an aluminum wire having a width of about 90 nm and an aspect ratio of about 2.5 was formed at pitches of about 180 nm on a quarts substrate having a thickness of 0.7 mm. In this example, a spin coating method was used for coating, but the coating method is not limited to the spin coating method. As shown in FIG. 3, the coating was irradiated with an ultraviolet ray at an intensity of 5 J/cm² by a 2 kW high-pressure mercury lamp from the quarts substrate surface side, and heated at 100° C. for 20 minutes. For heating at this time, it is more effective for swift generation of a high retardation to perform heating by an infrared heater or the like concurrently with ultraviolet irradiation. The refractive indexes of the retardation film in the directions satisfied the relationship of nB>nA=nC, showing that the polarization axis of the wire grid polarizer and the optical axis of the retardation film coincided.

(27)

EXAMPLE 4

A polymer of the following chemical formula (28) was spin-coated on a wire grid polarizer constituted such that an aluminum wire having a width of about 90 nm and an aspect ratio of about 2.5 was formed at pitches of about 180 nm on a quarts substrate having a thickness of 0.7 mm. As shown in FIG. 3, the coating was irradiated with an ultraviolet ray having a wavelength of 365 nm at an intensity of 7 J/cm² by a 2 kW high-pressure mercury lamp from the quarts substrate surface side, and heated at 100° C. for 20 minutes. For heating at this time, it is more effective for swift generation of a high retardation to perform heating by an infrared heater or the like concurrently with ultraviolet irradiation. The refractive indexes of the retardation film in the directions satisfied the relationship of nA>nB=nC, showing that the polarization axis of the wire grid polarizer and the optical axis of the retardation film coincided.

EXAMPLE 5

An N-methyl-2-pyrolidone solution of polyamic acid of the following chemical formula (29) was spin-coated on a wire grid polarizer constituted such that an aluminum wire having a width of about 90 nm and an aspect ratio of about 2.5 was formed at pitches of about 180 nm on a quarts substrate having a thickness of 0.7 mm. This substrate was heated at 70° C. for a minute, and then heated at 220° C. for 30 minutes and thereby imidized to obtain a polyimide film having a thickness of 200 nm. Next, as shown in FIG. 3, the film was irradiated with an ultraviolet ray having a wavelength of 254 nm at an intensity of 8 J/cm² by a 2 kW high-pressure mercury lamp from the quarts substrate surface side. At this time, the film was heated at 180° C. by an infrared heater concurrently with the irradiation. Rod-like liquid crystal molecules of the following chemical formula (30) were dropwise coated on the polyimide film, and the coating was heated at 140° C. and thereby solidified. The refractive indexes of the retardation film in the directions satisfied the relationship of nA>nB=nC, showing that the polarization axis of the wire grid polarizer and the optical axis of the retardation film coincided.

By applying to the liquid crystal display device the wire grid polarizer with a retardation film according to the present invention, a liquid crystal display device having a wide view angle, reduced power consumption and a high contrast ratio can be obtained. Main display modes of the liquid crystal display device include the TN (Twisted Nematic) mode, the IPS (In-Plane Switching) mode and the VA (Vertical Alignment) mode. According to the present invention, a wire grid polarizer with a retardation film suitable for each mode can be provided.

EXAMPLE 6

An example of a liquid crystal display device using the wire grid polarizer with a retardation film according to the present invention will be described below using FIGS. 10 to 12.

Figure 10:
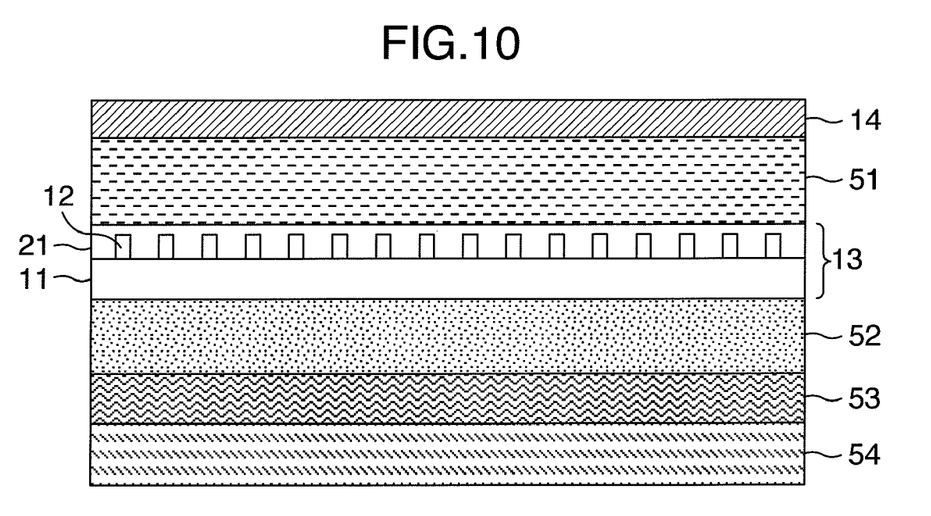
FIG. 10 is a schematic diagram of the cross-section of a liquid crystal display device.

When the wire grid polarizer with a retardation film according to the present invention is used, it preferably has the configuration shown in FIG. 10 is preferable. At this time, the retardation film 21 for view angle compensation is placed on a liquid crystal panel 51 side. When light emitted from a light source 52 is incident to a wire grid polarizer with a retardation function 13, then polarized light in one direction is transmitted to the liquid crystal panel 51 side, and polarized light in the other direction is reflected to the light source 52 side. By reflecting the reflected polarized light again by a reflecting plate 54 to be reused, power consumption can be reduced as compared to a case where an absorption polarizing plate is used.

At this time, it is more effective to place a ¼ wavelength plate 53 such that its optical axis forms an angle of 45° with the polarization axis of the reflected polarized light, since the optical axis coincides with the transmission axis of the wire grid polarizer 13 with a retardation function in the process of reflecting again the polarized light reflected by the wire grid polarizer with a retardation function 13. Reference numeral 14 denotes the other polarizer.

Figure 11:
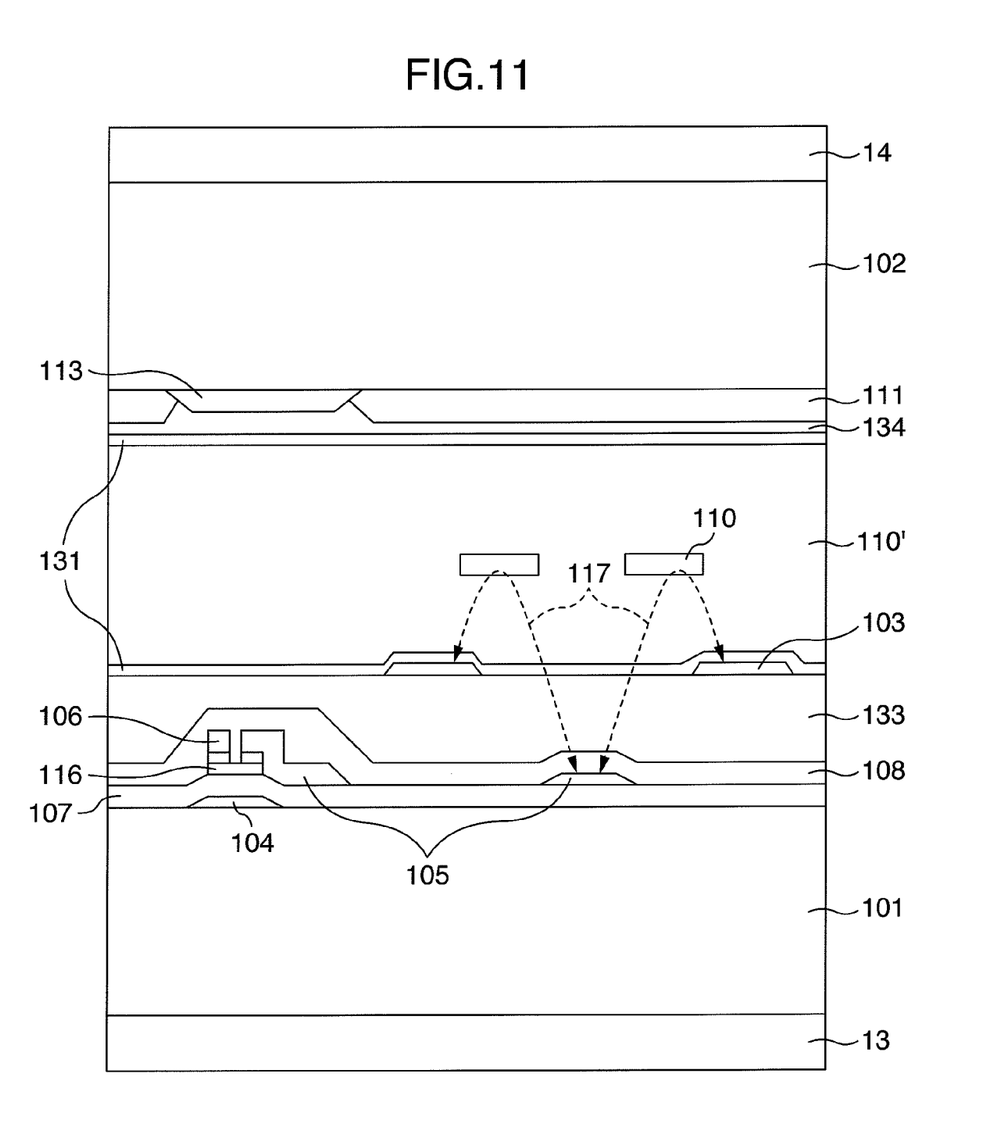
FIG. 11 is a sectional view of an IPS mode liquid crystal display device.
Figure 12:
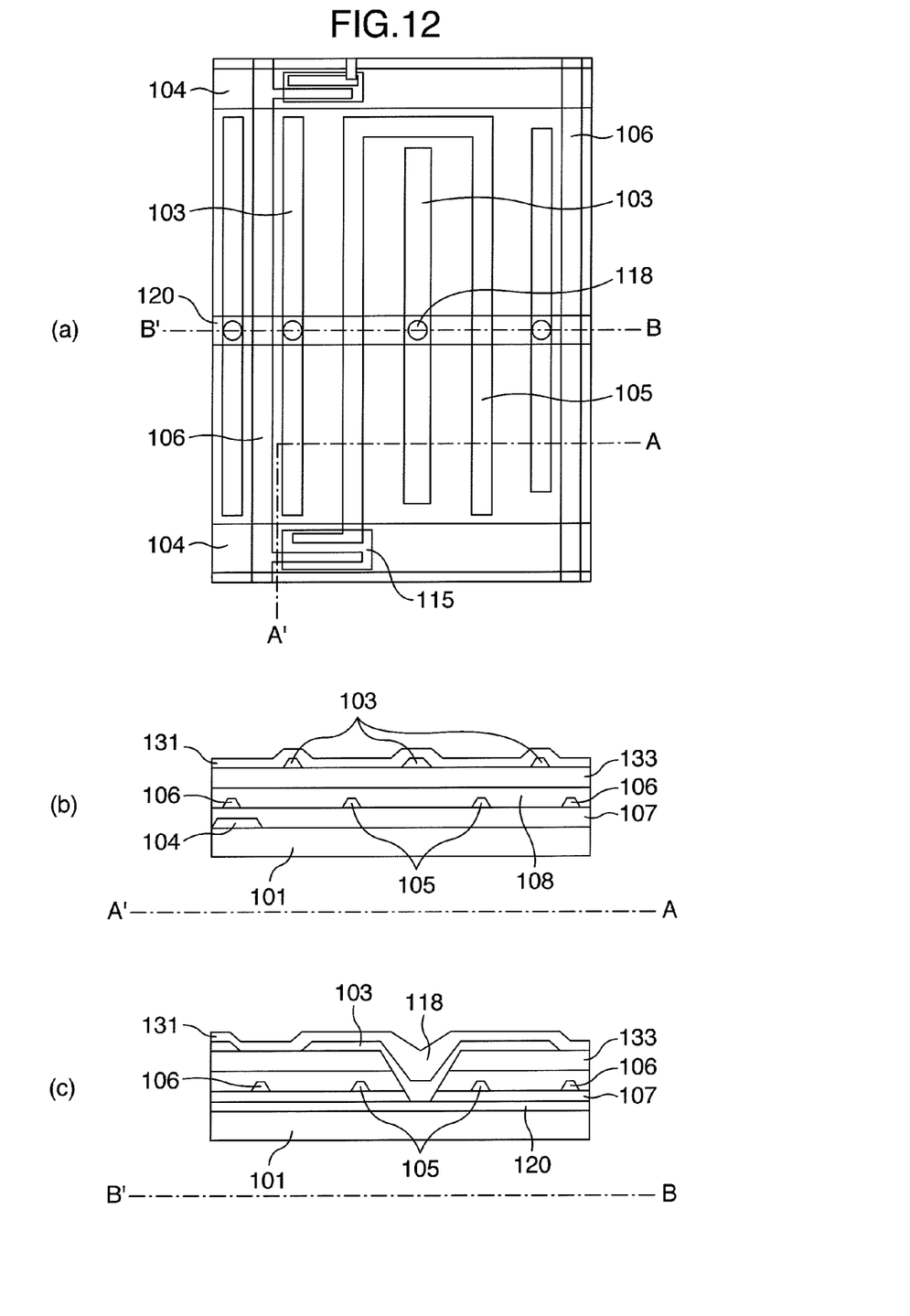
FIGS. 12(A), 12(B) and 12(C) show a pixel area of an active matrix substrate of the IPS mode liquid crystal display device.

FIG. 11 is a schematic sectional view of a single pixel and nearby region for explaining the example of an IPS mode liquid crystal display device according to the present invention. FIGS. 12(A), 12(B) and 12(C) are schematic diagrams of an active matrix substrate for explaining the configuration of the single pixel and nearby region for explaining the example of the IPS mode liquid crystal display device according to the present invention.

FIG. 12(A) is a plan view, FIG. 12(B) is a sectional view taken along line A-A' of FIG. 12(A), and FIG. 12(C) is a sectional view taken along line B-B' of FIG. 12(A). FIG. 11 corresponds to a part of the cross-section taken along line A-A' of FIG. 12(A). The sectional views of FIGS. 12(B) and 12(C) schematically show the configurations of essential parts for emphasis, and do not correspond uniquely to the sections taken along line A-A' and line B-B' of FIG. 12(A). For example, in FIG. 12(C), only one part of a through-hole 118 connecting a common electrode 103 and a common wiring 120 is shown as a representative thereof.

In FIG. 11, on a glass substrate 101 as an active matrix substrate are placed a gate electrode (scan signal electrode) 104 made of Cr (chromium) and the common wiring (common electrode wiring) 120 shown in FIGS. 12(A) and (C), and a gate insulating film 107 made of silicon nitride is formed so as to cover the gate electrode 104 and the common electrode wiring 120. On the gate electrode 104 is placed a semiconductor film 116 made of amorphous silicon or polysilicon with the gate insulating film 107 interposed therebetween, with the semiconductor film 116 functioning as an active layer of a thin film transistor (TFT) as an active element. A drain electrode (video signal wiring) 106 and a source electrode (pixel electrode) 105 which are made of Cr/Mo (chromium/molybdenum) are placed so as to be superimposed on a part of a pattern of the semiconductor film 116, and a protective film 108 made of silicon nitride is formed so as to cover the entire electrodes.

As schematically shown in FIG. 12(C), the common electrode 103 connected to the common electrode wiring 120 through the through-hole 118 formed through the gate insulating film 107 and the protective film 108 is placed on an organic protective film 133. As apparent from FIG. 12(A), the common electrode 103 drawn through the through-hole 118 from the common electrode wiring 120 is formed opposite to a pixel electrode 105 in a single pixel region when viewed planewise.

Thus, in this example, the pixel electrode 105 is placed on a layer under the protective film 108 under the organic protective film 133, and the common electrode 103 is placed on the organic protective film 133. Single pixels are formed by regions between the pixel electrodes 105 and the common electrodes 103. An alignment film 131 is formed on the surface of the active matrix substrate on which unit pixels formed as described above are arranged in the form of a matrix, namely the organic protective film 133 on which the common electrode 103 is formed.

As shown in FIG. 11, on the glass substrate 102 forming an opposite substrate is placed a color filter layer 111 which is sectioned pixel by pixel by a light blocking portion (black matrix) 113, and the color filter layer 111 and the light blocking portion 113 are covered with an organic protective film 134 made of transparent insulating material. On the organic protective film 134 is also formed the alignment film 131 to form a color filter substrate. These alignment films 131 are given a liquid crystal controlling capability by a rubbing alignment treatment.

The glass substrate 101 forming the active matrix substrate and the glass substrate 102 forming the opposite electrode are placed opposite to each other with respect to the surfaces of alignment films 131, and a liquid crystal layer (liquid crystal composition layer) 110' composed of liquid crystal molecules 110 is placed therebetween.

The active matrix liquid crystal display device, i.e. TFT liquid crystal display device, using a thin film transistor is formed in a manner described above. In the TFT liquid crystal display device, liquid crystal molecules 110 forming the liquid crystal composition layer 110' are aligned almost in parallel to the surfaces of substrates 101 and 102 placed opposite to each other during non-application of an electric field, and homogeneously aligned in a state of extending in an initial alignment direction defined by the rubbing alignment treatment.

When a voltage is applied to the gate electrode 104 to turn on the thin film transistor (TFT), an electric field 117 is applied to the liquid crystal composition layer due to a difference in electric potential between the pixel electrode 105 and the common electrode 103, and liquid crystal molecules 110 forming the liquid crystal composition layer is reoriented in the electric field direction by an interaction between the dielectric anisotropy of the liquid crystal composition and the electric field. At this time, by the refractive anisotropy of the liquid crystal composition layer and the action of polarizing plates 13 and 14, the light transmittance of the liquid crystal display device can be changed to provide display.

For organic protective films 133 and 134, a thermoset resin such as an acryl resin, epoxy acryl resin or polyimide resin having an excellent insulating property and transparency may be used. Furthermore, as organic protective films 133 and 134, a photocurable transparent resin may be used or an inorganic material such as a polysiloxane resin may be used. Moreover, organic protective films 133 and 134 may also function as the alignment film 132.

Using such an IPS mode liquid crystal panel, a liquid crystal display device shown in FIG. 10 was fabricated. At this time, as the wire grid polarizer 13 with a retardation film provide in the liquid crystal panel 51, one with the refractive index anisotropy satisfying the relationship of nB=nC>nA as shown in example 2 was used. As a control, similar IPS mode liquid crystal display device was fabricated using a wire grid polarizer having no retardation film. The contrast ratio view angle property of the liquid crystal display device was measured by Ez-Contrast 160R (manufactured by ELDIM), and it was shown that the view angle at a contrast ratio of 50 or greater was increased by about 20% and the liquid crystal display device had a good view angle property.

A wire grid polarizer with a polarizing film according to the present invention will now be described using FIG. 13.

First, if a conventional wire grid polarizer is used in the liquid crystal display device, a wire grid polarizer having a sufficient extinction ratio in a visible range is required. However, the metal wire of the wire grid polarizer requires narrow pitches and a high aspect ratio, and it is difficult to fabricate such a wire grid polarizer.

Furthermore, if the conventional wire grid polarizer is used in the liquid crystal display device, there arises the problem of decreasing a contrast ratio in a light room, since external light is reflected at the surface of the wire grid polarizer.

Thus, the wire grid polarizer with a polarizing film according to the present invention is capable of improving the extinction ratio of the conventional wire grid polarizer and preventing reflection of light at the surface of the metal wire.

Figure 13:
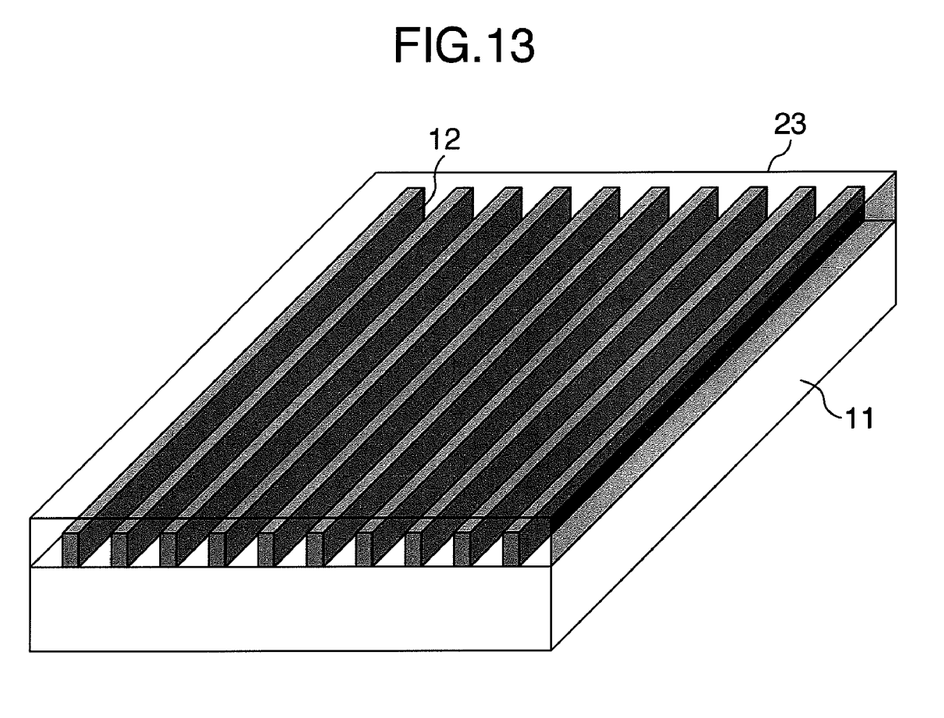
FIG. 13 is a structural diagram of a wire grid polarizer with a polarizing film.

The wire grid polarizer is characterized in that a polarizing film 23 having an absorption axis in a direction same as the longer direction of the metal wire 12 is provided on a surface of the wire grid polarizer on the metal wire 12 side as shown in FIG. 13.

The polarizing film 23 is characterized in that a dye compound having the following chemical-structural features is added in a transparent resin film. Namely, the molecular structure is a long linear rod-like structure, aromatic rings constituting the compound have the same plane characteristic, there is a part that is photoisomerized, such as a stilbene structure or an azobenzene structure, and it is preferable that there are not many groups involved in hydrogen bonding.

Typical examples include polysuazo direct dyes, C.I. Direct Yellow 12, 44, C.I. Direct Orange 39, C.I. Direct Red 23, 28, 31, 37, 79, 81, C.I. Direct Violet 9, 12, C.I. Direct Blue 1, 22, 78, 90, 151, C.I. Direct Green 1, C.I. Direct Black 17, Methyl Orange, Brilliant Yellow, Modern Yellow 10 and Acid Red 97, among them preferable are compounds including benzidine, diphenyl urea, stilbene, dinaphthylamine, J-oxygen and anthraquinone structures.

Examples of transparent resins include polymer resins such as polycarbonate, polyethylene terephthalate, polyethylene naphthalate, polyacrylate, polyetherketone, polyethersulfone, polyketone, polyimide, triacetylcellulose, polyvinyl alcohol, a bulky cyclic olefin resin, polyester, polysulfone, polymethylmethacrylate, polystyrene, diethylene glycol biscarbonate, a styrene/acrylonitrile copolymer and a styrene/methacrylic acid copolymer.

The dye compounds described above are added in combination so that the color tone of the polarizing film in the wire grid polarizer with a polarizing film according to the present invention is almost uniform over a visible range.

When the wire grid polarizer with a polarizing film according to the present invention is used in the liquid crystal display device, it preferably has the configuration described in FIG. 10. At this time, it is effective to have a wire grid polarizer with a polarizing film as the polarizer 14 on the liquid crystal panel 51, since a high degree of polarization can be obtained and reflection of external light can be prevented.

Furthermore, when the wire grid polarizer with a polarizing film according to the present invention is used in the liquid crystal display device, the dye compounds described above are added in combination so as to compensate the degree of polarization and color tone of the opposite polarizer 14. Specifically, an iodine-based polarizing plate which is generally used in the liquid crystal display device has the problem that the extinction ratio at about 380 nm to about 450 nm in the visible range is lower than the extinction ratio in other wave ranges, and when the black is displayed by the liquid crystal display device, it is tinted with blue. Thus, FIG. 10, when the iodine-based polarizing plate is used in the outside polarizer 14 as an opposite polarizing plate, the polarizing film used in place of the retardation film 21 increases the extinction ratio at about 380 nm to about 450 nm by adjusting the amount of dye compound added.

The polarizing film is given an absorption anisotropy by application of light as shown in FIG. 3. When dye compound having a photoisomerized part as described previously is included in the resin, and light is applied as shown in FIG. 3, the dye compound is aligned by a photoisomerization reaction, and the film has an absorption axis in a direction parallel to the metal wire. An inverse absorption axis can be given if light is applied from the resin surface side. Light that is applied is preferably an ultraviolet ray of 365 nm or the like.

A method for production of the wire grid polarizer with a polarizing film according to the present invention will be described below using example 7.

EXAMPLE 7

A polarizing film composed of a dense polyimide film having a thickness of about 500 nm was formed on a wire grid polarizer constituted such that an aluminum wire having a width of about 90 nm and an aspect ratio of about 2.5 is formed at pitches of about 180 nm on a quarts substrate having a thickness of 0.7 mm by mixing diamine compounds, i.e. p-phenylenediamine and 1,4-diaminopyridine at a molar ratio of 1:1, adding Direct Blue 1, Direct Red 81 and Brilliant Yellow to a polyamic acid varnish with an acid dianhydride consisting of 1,2,3,4-cyclobutanetetracarboxylic dianhydride, adjusting the concentrations of components so that the concentration of resin components was 6 wt %, the concentration of Direct Blue 1 was 0.2 wt %, the concentration of Direct Red 81 was 0.3 wt %, the concentration of Brilliant Yellow was 0.5 wt %, the concentration of NMP was 60 wt %, the concentration of γ-butyllactone was 20 wt % and the concentration of butylcellosolve was 13 wt %, printing the mixture and heating the same at 220° C. for 30 minutes. As shown in FIG. 3, the polarizing film was irradiated with an ultraviolet ray having a wavelength of 365 nm at an intensity of 10 J/cm$^2$ by a 2 kW high-pressure mercury lamp from the quarts substrate surface side. The extinction ratio of the wire grid polarizer with a polarizing film was measured, and it was shown that the extinction ratio was increased to about 170 after giving a polarizing film as compared to the extinction ratio of about 120 before giving the polarizing film.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A polarizer comprising:
   a transparent substrate;
   a plurality of metal wires formed mutually in parallel on one surface of the transparent substrate; and
   a retardation film formed on a surface of the metal wire;
   wherein an optical axis of the retardation film is parallel or perpendicular to a longer direction of the metal wire.

2. A polarizer comprising:
   a transparent substrate;
   a plurality of metal wires formed mutually in parallel on one surface of the transparent substrate;
   an alignment film formed on a surface of the metal wire; and
   a retardation film formed on a surface of the alignment film;
   wherein an optical axis of the retardation film is parallel or perpendicular to a longer direction of the metal wire.

3. The polarizer according to claim 1 or 2, wherein the retardation film is composed of liquid crystal molecules and/or a liquid crystal polymer.

4. The polarizer according to claim 3, wherein the liquid crystal molecules are rod-like liquid crystal molecules having a rod-like shape, with a longitudinal direction of the liquid crystal molecules being parallel to the longer direction of the metal wire.

5. The polarizer according to claim 3, wherein the liquid crystal molecules are disk-like liquid crystal molecules having a disk-like shape, and the disk-like liquid crystal molecules are stacked into a columnar shape, with a direction of the columnar shape being parallel to the longer direction of the metal wire.

6. The polarizer according to claim 3, wherein the liquid crystal molecules are fixed by polymerization.

7. The polarizer according to claim 1 or 2, wherein the retardation film is a polymer having an isomerized part of an azobenzene compound and/or a stilbene compound.

8. The polarizer according to claim 1 or 2, wherein the transparent substrate is made of glass, quarts or resin film.

9. A polarizer comprising:

a transparent substrate;

a plurality of metal wires formed mutually in parallel on one surface of the transparent substrate; and a polarizing film formed on a surface of the metal wire;

wherein an absorption axis of the polarizing film is parallel to a longer direction of the metal wire.

10. The polarizer according to claim 9, wherein the polarizing film is composed of an azo compound and/or a stilbene compound.

11. The polarizer according to claim 9, wherein the transparent substrate is made of glass, quarts or resin film.

12. A liquid crystal display device comprising:

a pair of substrates;

a polarizer according to claim 1, 2 or 9 placed outside the pair of substrates;

a liquid crystal layer placed between the pair of substrates;

a group of electrodes formed on at least any one of the pair of substrates to apply an electric field to the liquid crystal layer; and a pair of alignment films formed on the pair of substrates, respectively, and a light source placed outside the pair of substrates.

13. The liquid crystal display device according to claim 12, wherein a direction of the electric field is parallel to the pair of substrates, and the liquid crystal layer is homeotropically aligned.

14. The polarizer according to claim 1, 2 or 9, wherein a pitch of the metal wire is 50 nm to 300 nm;

wherein a width of the metal wire is 25 nm to 200 nm; and wherein an aspect ratio of the metal wire is at least 1.

* * * * *